(12) United States Patent
Nakamura

(10) Patent No.: US 10,546,512 B2
(45) Date of Patent: Jan. 28, 2020

(54) LEARNING SUPPORT APPARATUS, DATA OUTPUT METHOD IN LEARNING SUPPORT APPARATUS, AND STORAGE MEDIUM

(71) Applicant: CASIO COMPUTER CO., LTD., Shibuya-ku, Tokyo (JP)

(72) Inventor: Kazuhisa Nakamura, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 151 days.

(21) Appl. No.: 14/728,089

(22) Filed: Jun. 2, 2015

(65) Prior Publication Data
US 2015/0356884 A1  Dec. 10, 2015

(30) Foreign Application Priority Data
Jun. 5, 2014 (JP) ................. 2014-117117

(51) Int. Cl.
*G09B 19/00* (2006.01)
*G09B 5/02* (2006.01)

(52) U.S. Cl.
CPC ........... *G09B 19/0061* (2013.01); *G09B 5/02* (2013.01); *G09B 19/0046* (2013.01)

(58) Field of Classification Search
CPC ...... G09B 19/0061; G09B 19/46; G09B 5/02; G09B 29/00; G09B 29/008
USPC ................................................ 434/154, 130
See application file for complete search history.

(56) References Cited

U.S. PATENT DOCUMENTS

| | | | | | |
|---|---|---|---|---|---|
| 5,259,763 A | * | 11/1993 | Wendel | ..................... | G09B 1/06 434/150 |
| 5,772,213 A | * | 6/1998 | McGlew | ................... | A63F 1/00 273/308 |
| 5,864,337 A | * | 1/1999 | Marvin | ............... | G06F 3/04815 707/E17.013 |
| 5,927,719 A | * | 7/1999 | Young | ....................... | A63F 1/00 273/302 |
| 6,154,689 A | * | 11/2000 | Pereira | ................. | G01C 21/343 340/993 |

(Continued)

FOREIGN PATENT DOCUMENTS

| CN | 102999548 A | 3/2013 |
|---|---|---|
| JP | 61295589 A | 12/1986 |

(Continued)

OTHER PUBLICATIONS

Britton, Peter; Britton, Jonny; TimeMaps History Atlas; 2010; TimeMaps; http://www.timemaps.com/history.*

(Continued)

*Primary Examiner* — Samchuan C Yao
*Assistant Examiner* — Joshua S Luo
(74) *Attorney, Agent, or Firm* — Holtz, Holtz & Volek PC

(57) ABSTRACT

According to one embodiment, a learning support apparatus includes a display unit and a processor. The processor executes a process of reading out map data of a designated age from a plurality of map data corresponding to a plurality of ages, and outputting the read-out map data; and reading out, if a position on a map is designated on the output map data, historical information relating to the designated position and the designated age of the map from historical dictionary data, and outputting the read-out historical information.

3 Claims, 7 Drawing Sheets

(56) References Cited

U.S. PATENT DOCUMENTS

| | | | | |
|---|---|---|---|---|
| 6,321,158 | B1* | 11/2001 | DeLorme | G01C 21/26 340/995.16 |
| 6,641,400 | B1* | 11/2003 | Kennedy | A63F 3/00063 273/256 |
| 8,069,412 | B2* | 11/2011 | Bankston | G06Q 10/00 715/255 |
| 8,237,714 | B1* | 8/2012 | Burke | G06F 17/30572 345/440 |
| 2004/0070602 | A1* | 4/2004 | Kobuya | G01C 21/36 715/738 |
| 2006/0238379 | A1* | 10/2006 | Kimchi | G01C 21/26 340/995.1 |
| 2008/0120419 | A1* | 5/2008 | Yamartino | H04L 63/08 709/229 |
| 2008/0129528 | A1* | 6/2008 | Guthrie | G09B 29/008 340/686.1 |
| 2009/0155749 | A1* | 6/2009 | Cogliano | G09B 27/08 434/145 |
| 2009/0319180 | A1* | 12/2009 | Robinson | G06Q 10/10 701/532 |
| 2012/0141046 | A1* | 6/2012 | Chen | G01C 21/32 382/282 |
| 2015/0111181 | A1* | 4/2015 | Ginsberg | G09B 19/0046 434/154 |

FOREIGN PATENT DOCUMENTS

| | | |
|---|---|---|
| JP | 2004191761 A | 7/2004 |
| JP | 2012068130 A | 7/2004 |
| JP | 2006058495 A | 3/2006 |
| JP | 2008145935 A | 6/2008 |

OTHER PUBLICATIONS

United States; Feb. 26, 2012; Wikipedia; https://en.wikipedia.org/wiki/United_States.*

Sheppard Software; 2012; sheppardsoftware.com; http://www.sheppardsoftware.com/World_GL.html; last accessed Mar. 14, 2018.*

North America: 2005AD; Jul. 3, 2013; TimeMaps; https://web.archive.org/web/20130703133129/http://www.timemaps.com:80/history/north-america-2005ad.*

The World Factbook: North America: United States; May 13, 2013; Central Intelligence Agency; https://web.archive.org/web/20130513190201/https://www.cia.gov/library/publications/the-world-factbook/geos/us.html.*

Chinese Office Action dated Jul. 17, 2017 issued in counterpart Chinese Application No. 201510303471.4.

Japanese Office Action dated Dec. 5, 2017 issued in counterpart Japanese Application No. 2014-117117.

Chinese Office Action dated Mar. 15, 2018 (and English translation thereof) issued in counterpart Chinese Application No. 201510303471.4.

Zheng, et al., "China Geographical Information System Association 4th Membership Congress and the 11th Annual Meeting Proceeding", Chinese History Geography Digital Application Platform Based on Chinese History Geographical Information System CHGIS, Aug. 28, 2008, pp. 1-25.

* cited by examiner

| HISTORICAL DICTIONARY DB | | | |
|---|---|---|---|
| ENTRY WORDS | POLITICS | CULTURE | PRODUCTS |
| ... | ... | ... | ... |
| 高句麗 (KOGURYO) | ... | ... | ... |
| 三国時代 (THREE KINGDOMS PERIOD) | ... | ... | ... |
| ... | ... | ... | ... |

| MAP DB (AREA-BY-AREA BASIS) | |
|---|---|
| YEAR | MAP DATA |
| XX (YEAR) - PRESENT | ... |
| XX - XX | ... |
| XX - XX | ... |
| XX - XX | ... |
| ... | ... |

| PLACE-NAME DB | | |
|---|---|---|
| PLACE-NAMES | COORDINATE DATA | |
| | COORDINATES | MAP |
| 高句麗 (KOGURYO) | X, Y (LATITUDE, LONGITUDE) | MAP ID |
| 百済 (PAEKCHE) | ... | ... |
| 新羅 (SILLA) | ... | ... |
| ... | ... | ... |

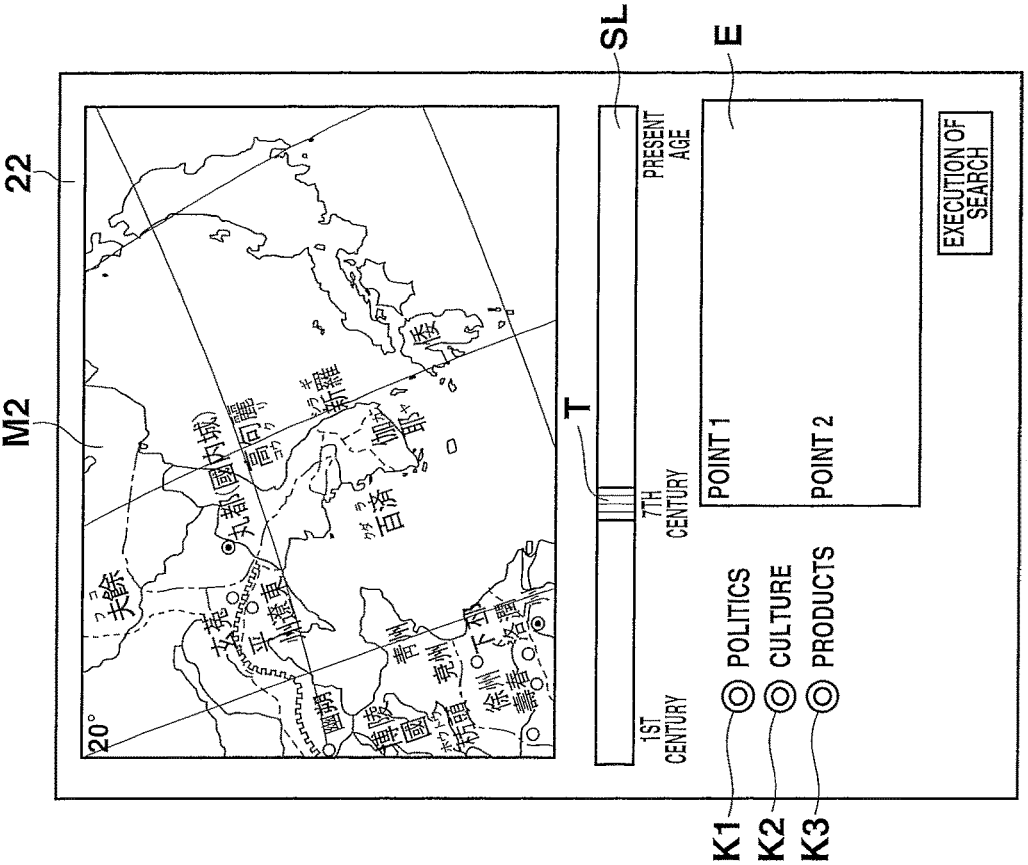
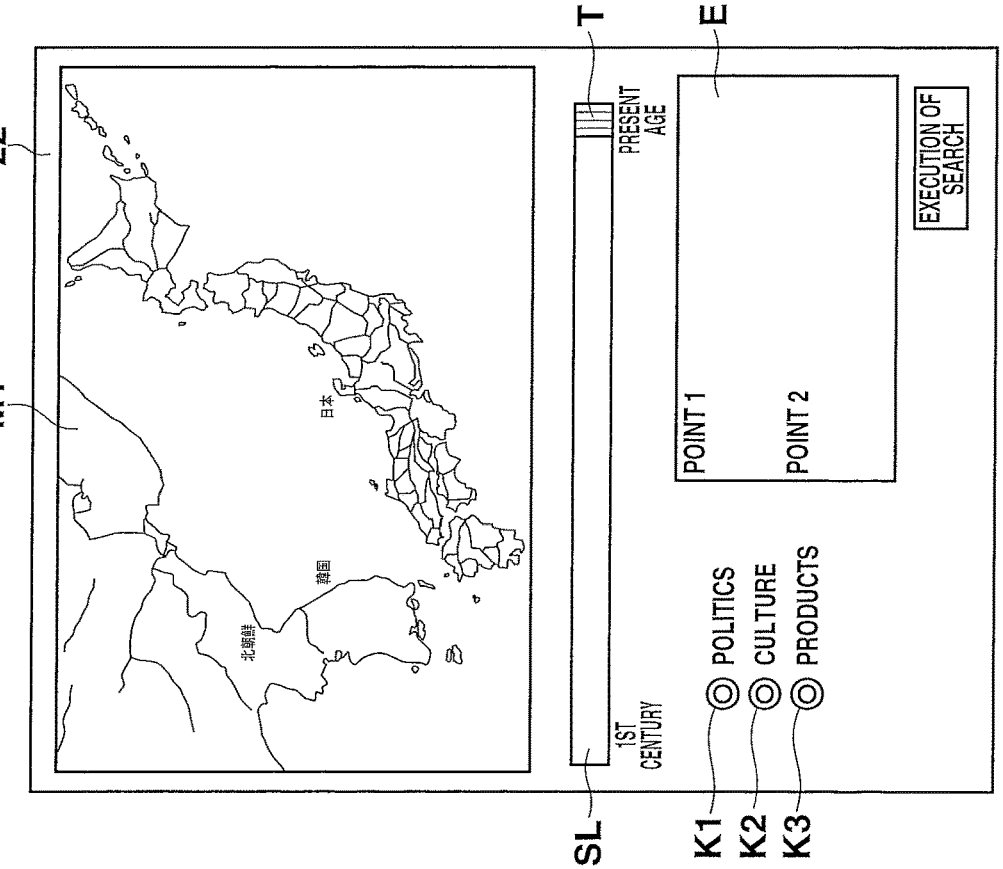

LEARNING SUPPORT APPARATUS, DATA OUTPUT METHOD IN LEARNING SUPPORT APPARATUS, AND STORAGE MEDIUM

CROSS-REFERENCE TO RELATED APPLICATIONS

This application is based upon and claims the benefit of priority from Japanese Patent Application No. 2014-117117, filed Jun. 5, 2014, the entire contents of which are incorporated herein by reference.

BACKGROUND OF THE INVENTION

1. Field of the Invention

The present invention relates to a learning support apparatus for supporting learning of history and geography, a data output method in the learning support apparatus, and a storage medium.

2. Description of the Related Art

Conventionally, as an apparatus for supporting learning of history, for example, the following is known.

There is thought a display system of historical event information with map information, wherein accurate map information composed of latitude and longitude of the earth is added to a historical information database, and historical event information can be comprehensively surveyed in chronological order by designating an area/age (e.g. Jpn. Pat. Appln. KOKAI Publication No. 2004-191761).

There is thought a historical map output apparatus wherein historical information corresponding to a time, which is designated by time designation information for designating a past time, is acquired, and an image of the acquired historical information can be displayed on an image of map information of an area relating to this historical information (e.g. Jpn. Pat. Appln. KOKAI Publication No. 2008-145935).

It is desired that learning be done more easily by associating historical matters with geography of the age of the historical matters.

The present invention has been made in consideration of the above problem, and the object of the invention is to provide a learning support apparatus and method, which enable easier learning by associating historical matters with geography of the age of the historical matters.

BRIEF SUMMARY OF THE INVENTION

A learning support apparatus according to the present invention includes a display unit and a processor. The processor is configured to execute a process of:

reading out map data of a designated age from a plurality of map data corresponding to a plurality of ages, and outputting the read-out map data; and reading out, if a position on a map is designated on the output map data, historical information relating to the designated position and the designated age of the map from historical dictionary data, and outputting the read-out historical information.

According to the learning support apparatus, learning can be done more easily by associating historical matters with geography of the age of the historical matters.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view illustrating the content of a historical dictionary DB 32$b$1 which is stored in a content DB 32$b$.

FIG. 5 is a view illustrating the content of a map DB (area-by-area basis) 32$c$1 which is stored in a map/place-name DB 32$c$.

FIG. 6 is a view illustrating the content of a place-name DB 32$c$2 which is stored in the map/place-name DB 32$c$.

FIG. 9A and FIG. 9B are views illustrating a first display operation of the learning support apparatus 10.

DETAILED DESCRIPTION OF THE INVENTION

Embodiments of the present invention will be described hereinafter with reference to the accompanying drawings.

Figure 1:
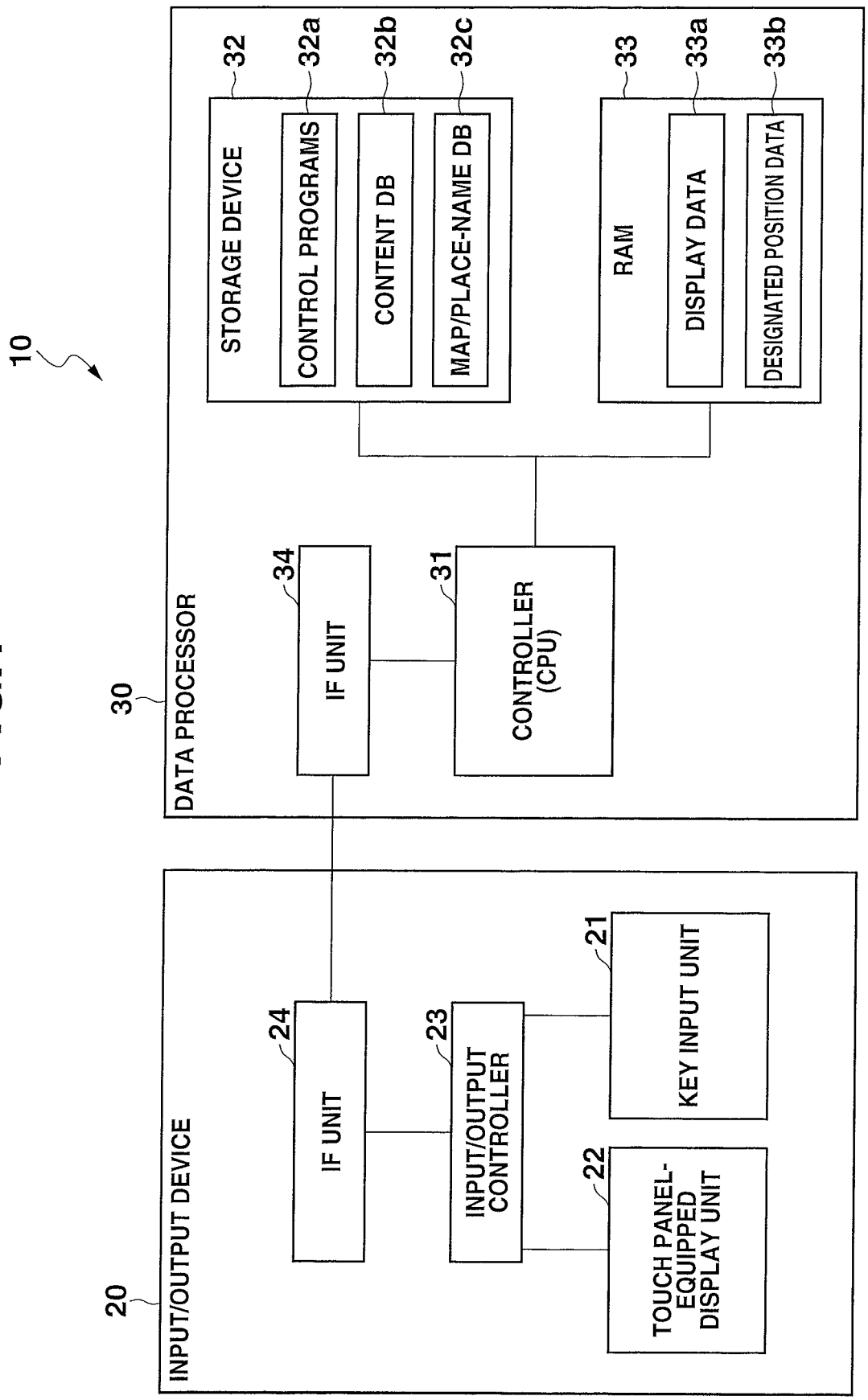
FIG. 1 is a block diagram illustrating a configuration of an electronic circuit of a learning support apparatus 10 according to an embodiment of the present invention.

FIG. 1 is a block diagram illustrating a configuration of an electronic circuit of a learning support apparatus 10 according to an embodiment of the present invention.

The learning support apparatus 10 is configured to include an input/output device 20 and a data processor 30 that is a computer.

The input/output device 20 includes a key input unit 21, a touch panel-equipped display unit 22, an input/output controller 23 for the key input unit 21 and touch panel-equipped display unit 22, and an interface (IF) unit 24 for connecting the input/output controller 23 to the data processor 30.

The data processor 30 includes a controller (CPU) 31, a storage device 32 which stores various programs for executing control operations of the controller 31, and databases, a RAM 33 which stores working data which is involved in the control operations, and an interface (IF) unit 34 for connecting the controller (CPU) 31 to the input/output device 20.

Figure 2:
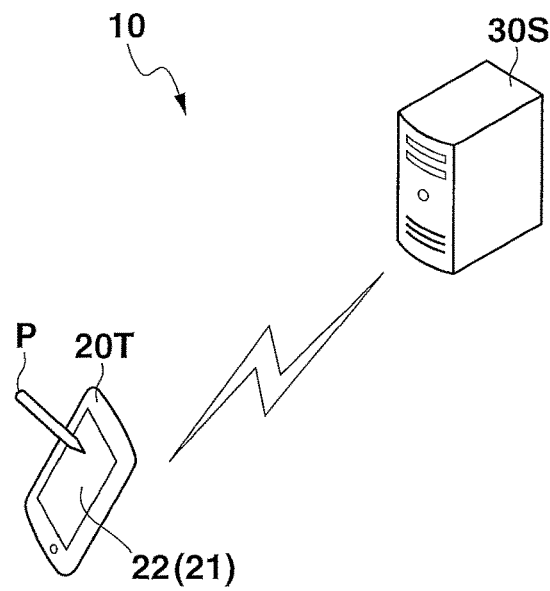
FIG. 2 is a configuration diagram in a case where the learning support apparatus 10 is realized by a tablet terminal 20T and a server apparatus 30S.

FIG. 2 is a configuration diagram in a case where the learning support apparatus 10 is realized by a tablet terminal 20T and a server apparatus 30S.

In the case of the learning support apparatus 10 illustrated in FIG. 2, the tablet terminal 20T functions as the input/output device 20, and the server apparatus 30S functions as the data processor 30.

Figure 3:
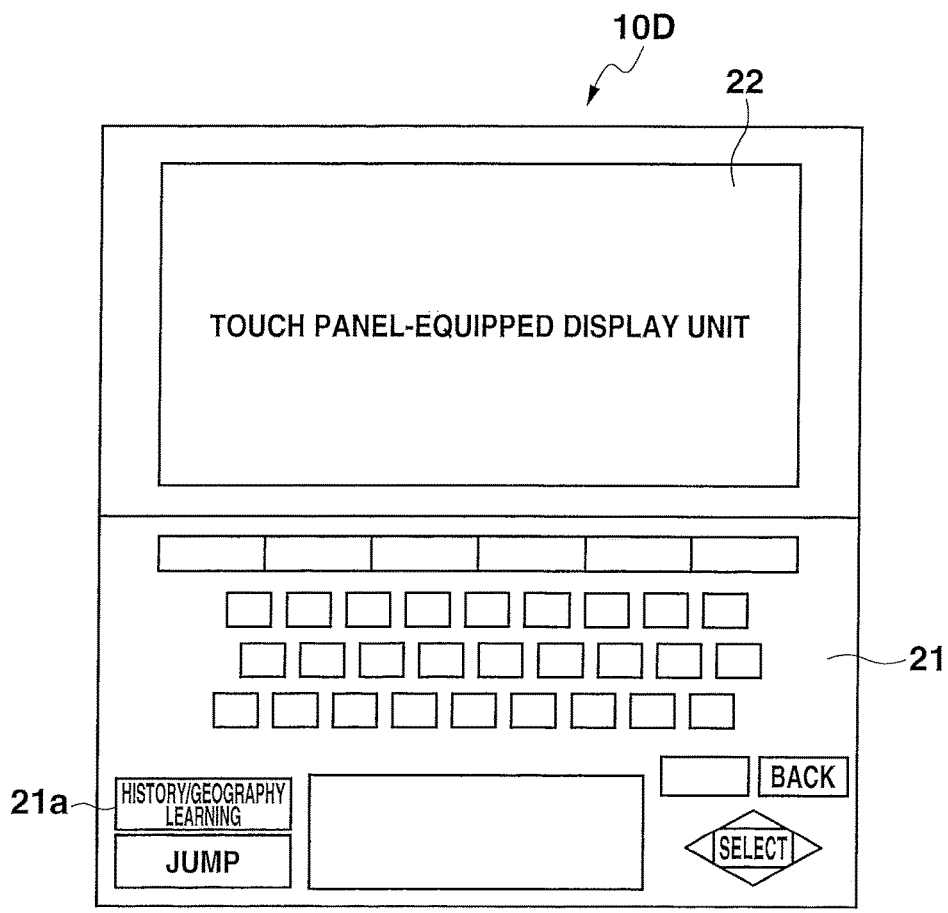
FIG. 3 is a front view of an external appearance in a case where the learning support apparatus 10 is implemented by an electronic dictionary apparatus 10D.

FIG. 3 is a front view of an external appearance in a case where the learning support apparatus 10 is implemented by an electronic dictionary apparatus 10D.

In the case of the electronic dictionary apparatus 10D illustrated in FIG. 3, both the input/output device 20 and the data processor 30 are integrally built in the electronic dictionary apparatus 10D. The key input unit 21 is provided on a lower case side of the apparatus body, and the touch panel-equipped display unit 22 is provided on an upper case side of the apparatus body. The key input unit 21 of the electronic dictionary apparatus 10D includes various dictionary designation keys, character input keys, a [Jump] key, a [Select] key, and a [Back] key. Furthermore, the key input unit 21 includes a [History/Geography Learning] key 21a for setting the operation mode of history/geography learning.

Control programs 32a which are executed by the controller 31, a content DB 32b and a map/place-name DB 32c are prestored in the storage device 32 of the data processor 30. These programs and data may be read in and stored from an external storage medium such as a CD-ROM or a memory card, or may be downloaded and stored from a program server on a communication network such as the Internet.

The control programs 32a include a system program which controls the operation of the entirety of the learning support apparatus 10, and a communication program for communicating data with an external device on the communication network, or a user PC (Personal Computer) which is not shown. In addition, the control programs 32a include a dictionary search program for controlling a search process, as a whole, for the content DB 32b in the storage device 32. Besides, the control programs 32a includes a learning support program for enabling learning in which a historical matter is associated with geography of the age of this historical matter, based on the content DB 32b and map/place-name DB 32c in the storage device 32.

The control programs 32a are started in accordance with an input signal corresponding to a user operation from the key input unit 21 of the input/output device 20 or the touch panel-equipped display unit 22, or a communication signal with an external device on the communication network. Various dictionary DBs (Databases), such as a Japanese dictionary, an English-Japanese dictionary, a Japanese-English dictionary, an English-English dictionary and a historical dictionary, are stored in the content DB 32b.

FIG. 4 is a view illustrating the content of a historical dictionary DB 32b1 which is stored in the content DB 32b in the data processor 30 of the learning support apparatus 10.

In this historical dictionary DB 32b1, information of history corresponding to ages in respective areas such as Asia, Europe, etc. is stored such that the data of entry words are associated with the data of matters of the politics, culture and products relating to the data of the entry words.

FIG. 5 is a view illustrating the content of a map DB (area-by-area basis) 32c1 which is stored in the map/place-name DB 32c in the data processor 30 of the learning support apparatus 10.

In this map DB (area-by-area basis) 32c1, map data relating to each age (XX (year) to YY (year)) is stored on an area-by-area basis with respect to areas such as Asia, Europe, etc.

FIG. 6 is a view illustrating the content of a place-name DB 32c2 which is stored in the map/place-name DB 32c in the data processor 30 of the learning support apparatus 10.

In this place-name DB 32c2, place-names existing on respective map data stored in the map DB (area-by-area basis) 32c1 and the data of XY coordinates (latitude and longitude) of the positions of the place-names are stored such that the place-names and the data of XY coordinates are associated with map IDs of the map data.

In the RAM 33 in the data processor 30, a display data storage area 33a and a designated position data storage area 33b are secured.

In the display data storage area 33a, display data, which is to be displayed on the touch panel-equipped display unit 22, is stored.

In the designated position data storage area 33b, position data, which was designated in accordance with a user operation on the displayed map data, is stored.

In the learning support apparatus 10 with the above-described structure, the controller (CPU) 31 of the data processor 30 controls the operations of the respective circuit components in accordance with instructions described in the control programs 32a (including the above-described dictionary search program and learning support program), and realizes functions, which will be described in the operational description below, by the cooperation between software and hardware.

Next, the operation of the learning support apparatus 10 with the above structure is described.

Figure 7:
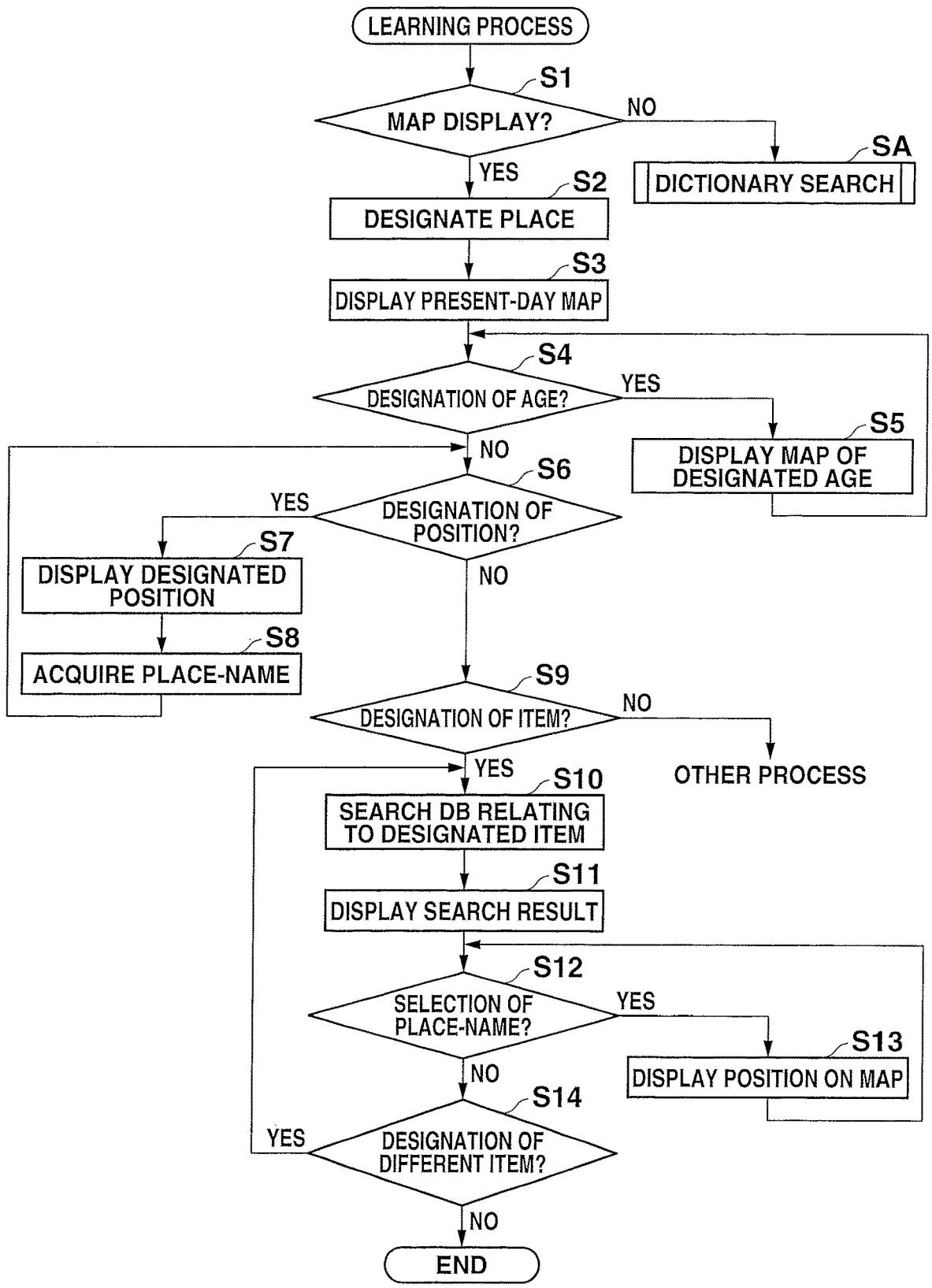
FIG. 7 is a flowchart illustrating a history/geography learning process which is executed by the learning support apparatus 10.

FIG. 7 is a flowchart illustrating a history/geography learning process which is executed by the data processor 30 of the learning support apparatus 10.

Figure 8:
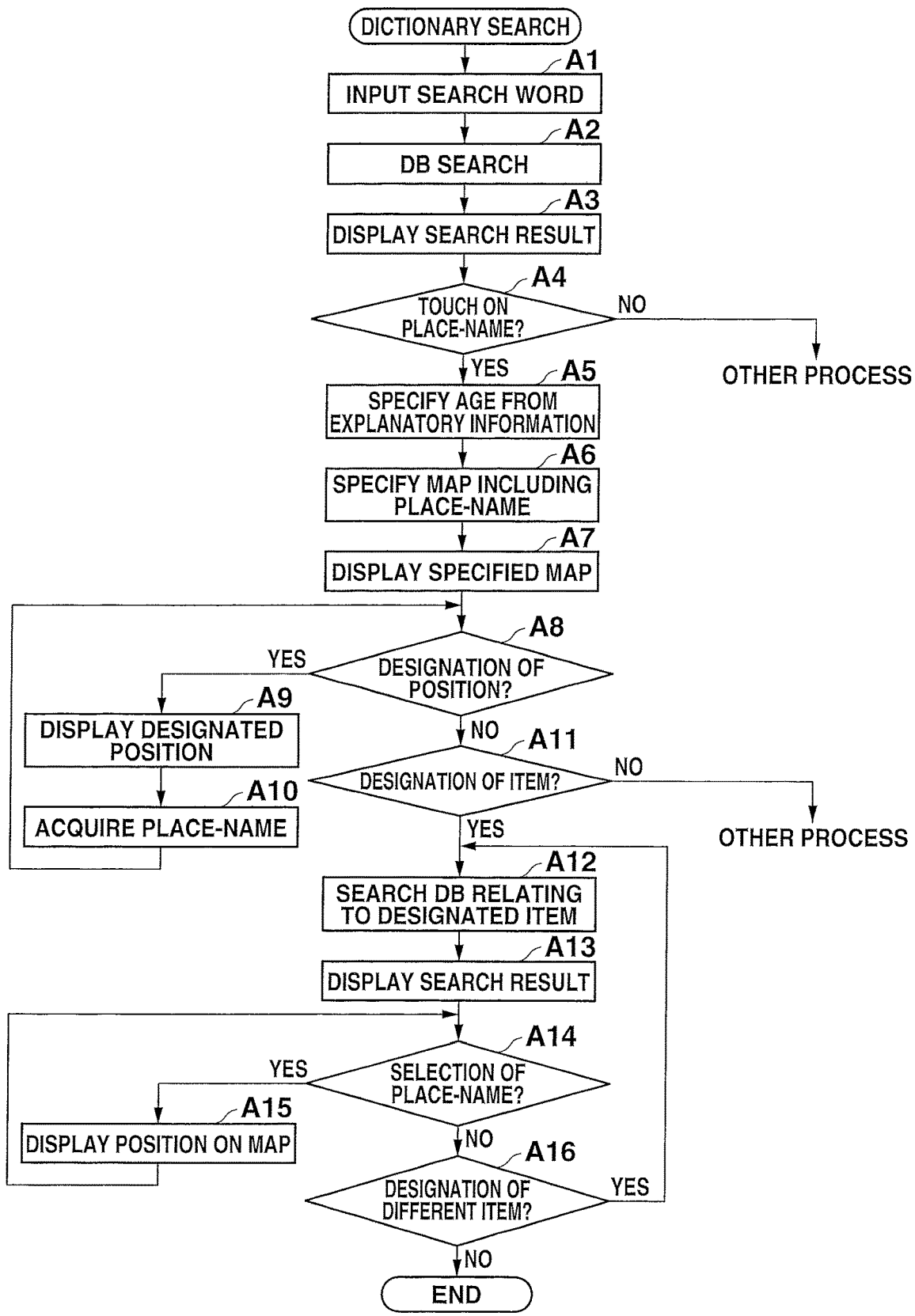
FIG. 8 is a flowchart illustrating a dictionary search process in the learning support apparatus 10.

FIG. 8 is a flowchart illustrating a dictionary search process in the history/geography learning process of the learning support apparatus 10.

FIG. 9A and FIG. 9B are views illustrating a first display operation in the input/output device 20 according to the history/geography learning process of the learning support apparatus 10.

Figure 10A:
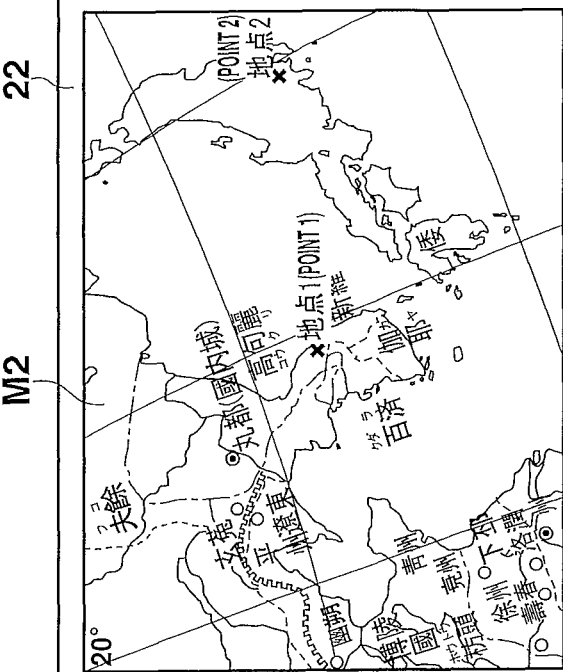
FIG. 10A and FIG. 10B are views illustrating a second display operation of the learning support apparatus 10.
Figure 10B:
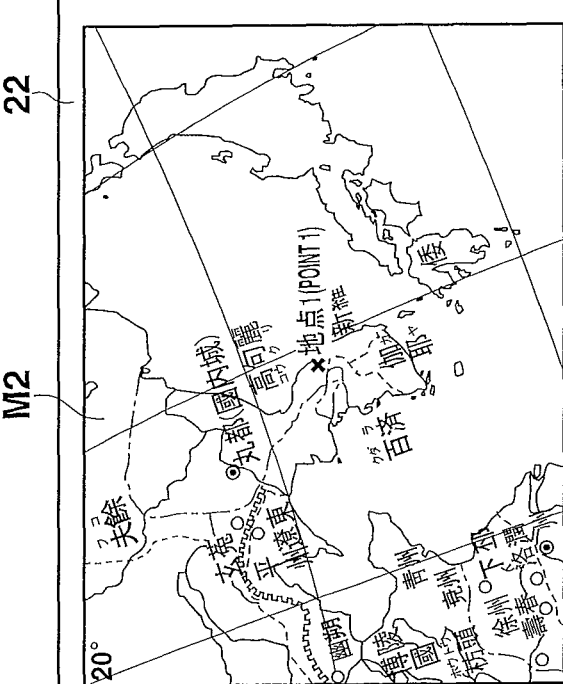

FIG. 10A and FIG. 10B are views illustrating a second display operation in the input/output device 20 according to the history/geography learning process of the learning support apparatus 10.

If the control program 32a (learning support program) of the data processor 30 is started by the data processor 30 in accordance with a user operation of the input/output device 20, an operation mode selection screen, which prompts selection of either a map learning mode for learning from a map or a dictionary learning mode for learning from a dictionary, is transmitted to the input/output device 20 and is displayed on the touch panel-equipped display unit 22 of the input/output device 20.

(Map Learning Mode)

If it is determined that the map learning mode was selected on the operation mode selection screen (step S1 (Yes)), an area designation screen for designating a place (area), which is to be set as an object of learning, is transmitted to the input/output device 20 and displayed.

If a user designates an area, which is to be set as an object of learning, through the area designation screen (step S2), present-day map data of the designated area is read out from the map DB (area-by-area basis) 32c1 of the map/place-name DB 32c, and, as illustrated in FIG. 9A, the present-day map data is transmitted to the input/output device 20 and displayed (step S3).

FIG. 9A illustrates a state in which "East Asia area" is designated as the designated area, and map data M1 of the modern East Asia area is displayed.

At this time, an age designation slider SL for designating an age is displayed under the map data M1. Incidentally, a tab T of the age designation slider SL initially designates the present age. In addition, item buttons "Politics" K1, "Culture" K2 and "Products" K3 for designating what kind of matters are to be learnt with respect to the designated age are displayed. The searched history or geography information is displayed on an information display area E.

Then, if the tab T of the age designation slider SL is operated by the user and the age of the seventh century, for instance, is designated as illustrated in FIG. 9B, it is determined in the data processor 30 that the age was designated (step S4 (Yes)), and map data M2 of the "East Asia area" corresponding to the "seventh century" is read out from the map DB (area-by-area basis) 32c1, transmitted to the input/output device 20 and displayed (step S5).

If the user touches one point on the map of the map data M2 of the "East Asia area" of the "seventh century" displayed on the touch panel-equipped display unit 22, it is determined in the data processor 30 that a position was designated (step S6 (Yes)), and, as illustrated in FIG. 10A, a designated position mark "x Point 1" is displayed at the touched position on the map data M2 (step S7).

Then, the XY coordinates (latitude/longitude) corresponding to the designated position "x Point 1" and the place-name of the designated position "x Point 1" are acquired from the place-name DB 32c2, and "Point 1; North latitude: 37.17892, East longitude: 128.673019, 高句麗国 (Koukurikoku "Koguryo") イモクリ (Imokuri)" is displayed (step S8). Incidentally, a plurality of places can be designated by the position designation.

If the user operates, for example, the item button "Politics" K1, it is determined that the item was designated (step S9 (Yes)), and matters (historical information) of "Politics" including the place-name "Point 1: 高句麗国 (Koukurikoku "Koguryo") イモクリ (Imokuri)" are searched from the historical dictionary DB 32b1 (step S10). As a result, as illustrated in FIG. 10B, the content "高句麗 (Bc37 年頃－668年" (Koguryo (c. 37 BC-668 AD) . . . ) is displayed on the information display area E as the search result (step S11).

In the meantime, when the user designated a plurality of positions on the map data M2, the coordinates corresponding to the respective designated positions "Point 1, Point 2, . . ." and the place-names thereof are acquired and displayed. Then, if an arbitrary button Kn of the item buttons is designated, common matters of the designated item, which include the place-names of the respective designated positions, are searched from the historical dictionary DB 32b1 and displayed (steps S6 to S11).

In the state in which the search result is displayed on the information display area E, as illustrated in FIG. 10B, if a place-name "武蔵国高麗郡" (Musashinokuni Komagun) h in the text of the search result is selected, it is determined that the place-name was selected (step S12 (Yes)). Then, the XY coordinates (latitude/longitude) of the position corresponding to the designated place-name is read out from the place-name DB 32c2, and a designated position mark "x Point 2" is displayed at the corresponding position on the map data M2 (step S13).

Then, if an item button Kn, which is other than from the "Politics" K1, is designated (step S14 (Yes)), matters of the other item (Kn), which include the place-name of the designated position, are searched from the historical dictionary DB 32b1 and displayed (steps S10 and S11).

(Dictionary Learning Mode)

On the other hand, if it is determined that the dictionary learning mode was selected by a user operation on the operation mode selection screen (step S1 (No)), a transition occurs to the dictionary search process illustrated in FIG. 8 (step SA).

If the dictionary search process is started, an input screen of a search word is displayed on the touch panel-equipped display unit 22 of the input/output device 20. The user inputs a search word on this input screen (step A1). Next, in the data processor 30, an entry word corresponding the input search word is searched from the historical dictionary DB 32b1 (step A2).

Then, explanatory information (historical information) of the searched entry word is read out of the historical dictionary DB 32b1, and is displayed on the touch panel-equipped display unit 22 of the input/output device 20 (step A3).

If the user touches a place-name included in the displayed explanatory information (historical information) (step A4 (Yes)), the associated age is specified from the text of characters and numerals, such as "西暦" (AD), "BC" and "年" (year), which are included in this explanatory information (step A5).

Then, map data Mn of the specified age, which relates to the area including the designated place-name, is specified based on the map DB (area-by-area basis) 32c1 and place-name DB 32c2 (step A6), and the specified map data is read out and displayed on the touch panel-equipped display unit 22 of the input/output device 20 (step A7).

In this manner, if a transition occurs to the state (steps A1 to A7) in which the map data Mn of the specified age and area is displayed after the explanatory information (historical information) of the dictionary was displayed, the same subsequent process (steps A8 to A16) as the process of steps S6 to S14, which has been described in the operational description of the map learning mode, will be executed.

Specifically, if a point on the map data Mn is touched by the user (step A8 (Yes)), the designated position is displayed as illustrated in FIG. 10A (step A9), and the place-name of this position is acquired and displayed (step A10).

In addition, if the item button Kn is designated (step A11 (Yes)), matters (historical information) of the corresponding item (Kn), which include the place-name of the designated position, are searched from the historical dictionary DB 32b1 and displayed (steps A12 and A13).

Then, if a place-name h in the text of the displayed matters (historical information) is selected (step A14 (Yes)), the position on the map data Mn, which corresponds to the selected place-name h, is displayed (step A15).

In addition, if an item button Km, which is other than the designated item button Kn, is designated (step A16 (Yes)), matters of the other item (Km), which include the place-name of the designated position, are searched from the historical dictionary DB 32b1 and displayed (steps A12 and A13).

Thus, according to the learning support apparatus 10 with the above-described structure, each point on the map of the age that is the object of learning can be designated, and the historical matters, which occurred at the designated point, can easily be learnt.

Additionally, based on historical matters (historical information) displayed in accordance with the place-name of the position designated on the map, the position on the map of the place-name included in those historical matters can easily be displayed.

Additionally, from the place-name included in desired historical matters (historical information) searched from the historical dictionary, a map relating to the age of these historical matters, on which this place-name is present, can easily be displayed.

Therefore, easier learning is enabled by associating a historical matter with geography of the age of the historical matter.

Incidentally, the methods and databases (DBs) of the respective processes by the learning support apparatus 10 described in each of the embodiments, that is, the respective methods of the history/geography learning process illustrated in FIG. 7 and the dictionary search process in the history/geography learning process illustrated in FIG. 8 and the content DB 32b and map/place-name DB 32c, can all be stored as computer-executable programs in a medium of an external storage device, such as a memory card (ROM card, RAM card, etc.), a magnetic disk (floppy disk, hard disk, etc.), an optical disc (CD-ROM, DVD, etc.), or a semiconductor memory, and can be distributed. In addition, the computer (controller) of the electronic device reads the program, which is stored in the medium of the external storage device, into the storage device, and the operation is controlled by this read-in program. Thereby, it is possible to realize the learning support function, which has been described in each of the embodiments, and to execute the same processes by the above-described methods.

In addition, the data of the program for realizing each of the above-described methods can be transmitted on a communication network in the form of a program code, and the data of the program can be taken in the electronic device from a computer apparatus (program server) connected to this communication network, and stored in the storage device, thereby realizing the above-described learning support function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic learning support apparatus comprising:
a display;
a memory;
a storage storing, in association with each other, (i) map data for each of a plurality of historical ages, (ii) position data related to each of a plurality of place names associated with the map data for any one of the plurality of historical ages, and (iii) historical information data including data of a plurality of topics of learning, each of the plurality of topics of learning being related to any one of the plurality of place names; and
a hardware processor which, under control of a program stored in the memory, executes processes comprising:
a first display process which controls the display to display (i) one map from among the map data stored in the storage, the one map corresponding to a historical age designated by a user, and (ii) a plurality of topic names each of which indicates one of the plurality of topics of learning and is selectable by a designation operation performed by the user;
a first place name acquisition process which, in response to the user designating a first position on the displayed one map, automatically (i) controls the display to display a first mark on the displayed one map at the first position and (ii) acquires, from the position data stored in the storage, a first place name corresponding to the first position based on the position data; and
a second display process which, in response to the user selecting one of the displayed plurality of topic names by performing the designation operation, automatically (i) obtains, from the historical information data stored in the storage, data of one of the plurality of topics of learning associated with both the acquired first place name and the selected one of the displayed plurality of topic names, and (ii) controls the display to display the obtained data of the one of the plurality of topics of learning, thereby enabling the user to easily learn historical information indicated by the displayed data of the one of the plurality of topics of learning,
wherein the obtained data of the one of the plurality of topics of learning comprises text including a second place name, and
wherein the hardware processor further executes:
a third display process which, in response to the user designating the second place name included in the displayed data of the one of the plurality of topics of learning, automatically controls the display to display a second mark on the displayed one map at a second position corresponding to the second place name, based on the position data related to the second place name, such that both of the first mark and the second mark are displayed on the displayed one map simultaneously, thereby enabling the user to easily learn geographical information corresponding to the second place name included in the displayed data of the one of the plurality of topics of learning.

2. The electronic learning support apparatus of claim 1, wherein the hardware processor further executes:
a second place name acquisition process which, in response to the user designating a plurality of positions on the displayed one map, automatically (i) controls the display to display a mark on the displayed one map at each of the plurality of positions and (ii) acquires, from the position data stored in the storage, place names respectively corresponding to the plurality of positions based on the position data.

3. The electronic learning support apparatus of claim 1, wherein the plurality of topics of learning are selected from among topics of politics, culture, and products.

* * * * *